Oct. 12, 1948.　　　　S. A. TOWNSEND　　　　2,451,130
COTTON PICKING MACHINE

Filed March 31, 1945　　　　　　　　　　　　3 Sheets-Sheet 1

Inventor
Sidney A. Townsend.
By [signature]
Attorney

Oct. 12, 1948.　　　　　S. A. TOWNSEND　　　　　2,451,130
COTTON PICKING MACHINE
Filed March 31, 1945　　　　　　　　　　　　3 Sheets-Sheet 2
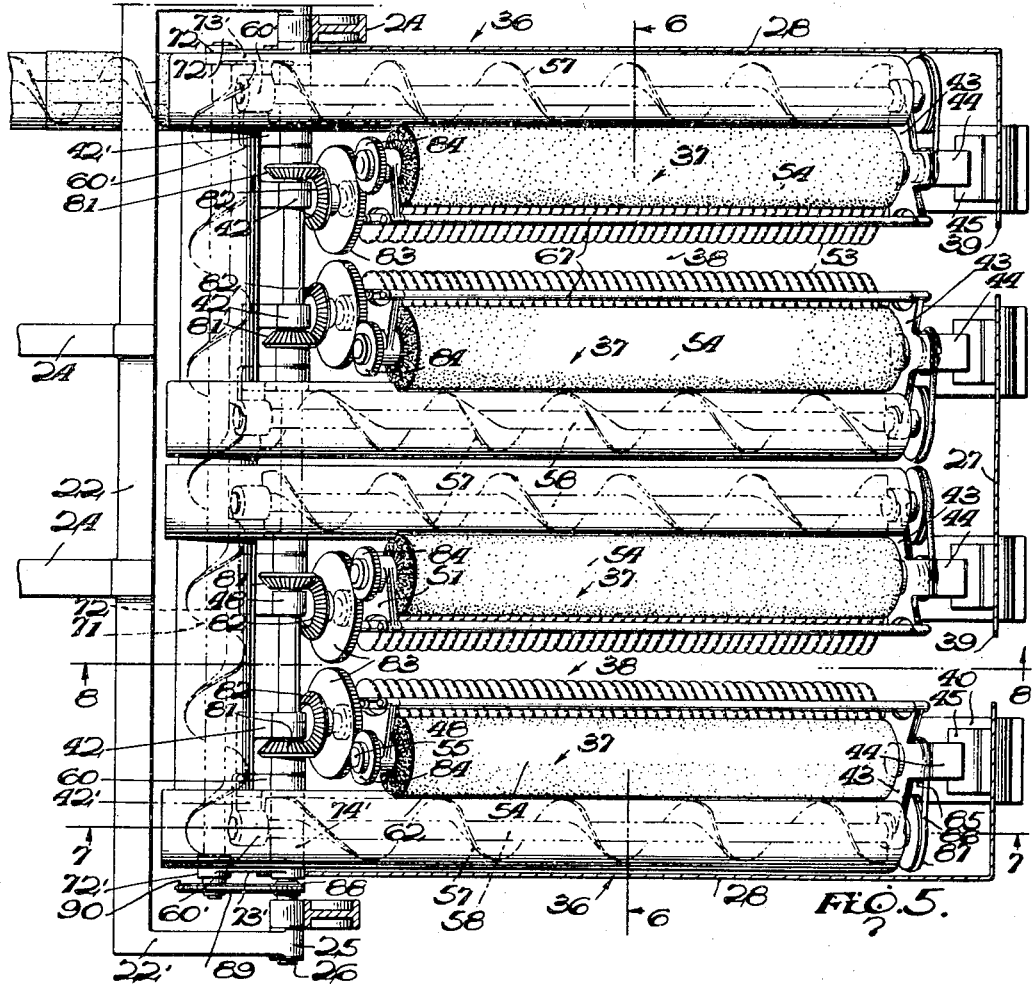
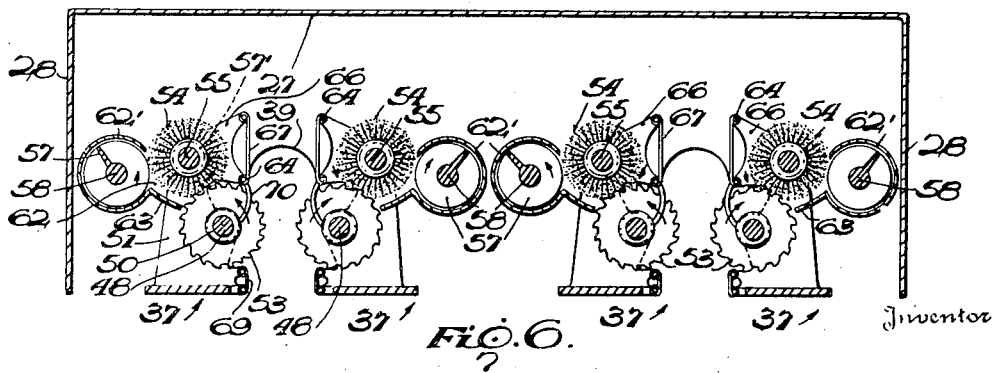
Inventor
Sidney A. Townsend.
By
Attorney Oct. 12, 1948.   S. A. TOWNSEND   2,451,130
COTTON PICKING MACHINE
Filed March 31, 1945   3 Sheets-Sheet 3
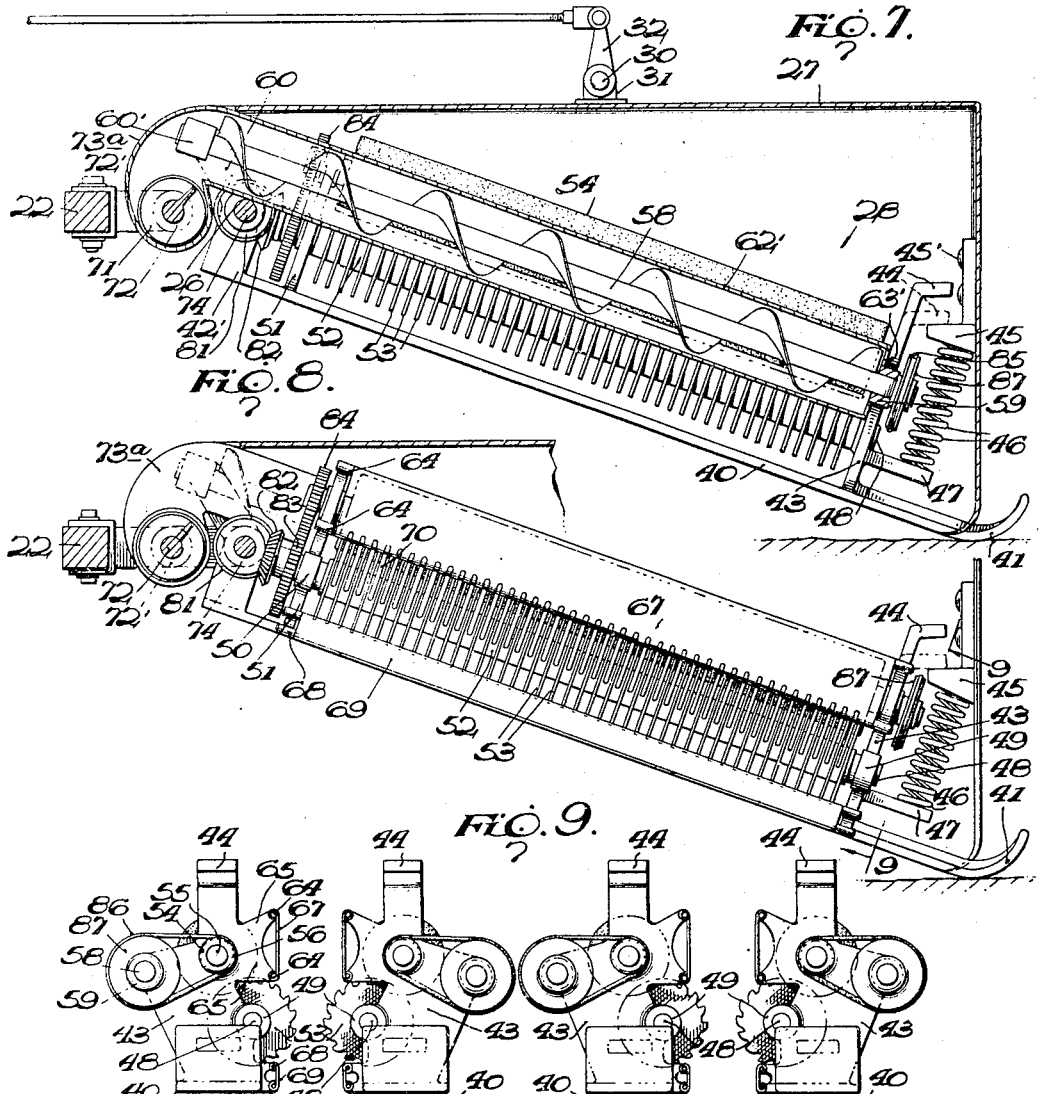
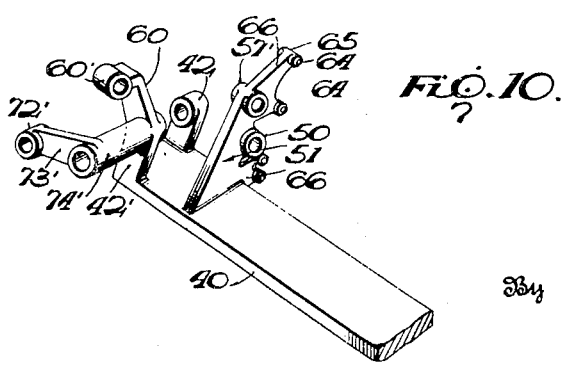
Inventor
Sidney A. Townsend
By
Attorney Patented Oct. 12, 1948

2,451,130

UNITED STATES PATENT OFFICE 2,451,130

COTTON-PICKING MACHINE

Sidney A. Townsend, Bennettsville, S. C.

Application March 31, 1945, Serial No. 585,936

2 Claims. (Cl. 56—40)

My invention relates to cotton pickers.

An important object of the invention is to provide a cotton picking machine which may be driven down a row of cotton plants for picking the cotton from the burrs.

A further object of the invention is to provide a machine of the above mentioned character which will properly pick cotton from the plants, having large varying amounts of cotton, without liability of the machine becoming choked or broken.

A further object of the invention is to provide a cotton picking machine wherein the picking action is performed by rotary gin saws.

A further object of the invention is to provide means operating in conjunction with the gin saws to clean the cotton and to subsequently remove the cotton from the teeth of the saws.

A further object of the invention is to provide a machine of the above mentioned character which will properly pick the cotton from plants of varying height.

A further object of the invention is to provide a machine of the above mentioned character having means whereby the picking units are individually vertically adjustable, to conform to the contour of the ground, and which are all raised for transportation.

A further object of the invention is to provide means for separating out the picked cotton, to a considerable extent, from the trash, including branches, leaves or the like.

A further object of the invention is to provide a cotton picking machine which may be mounted upon a tractor to be transported thereby and having is operating parts driven by the tractor.

Other objects and advantages of the invention will be apparent during the course of the following description.

Figure 1:
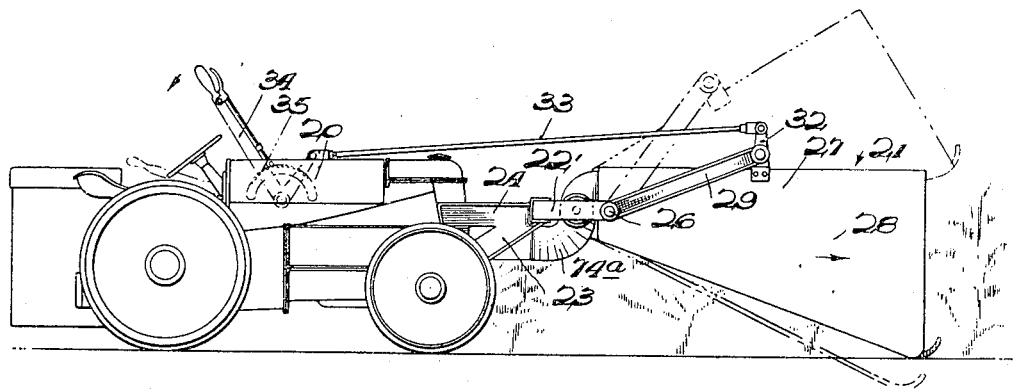
Figure 2:
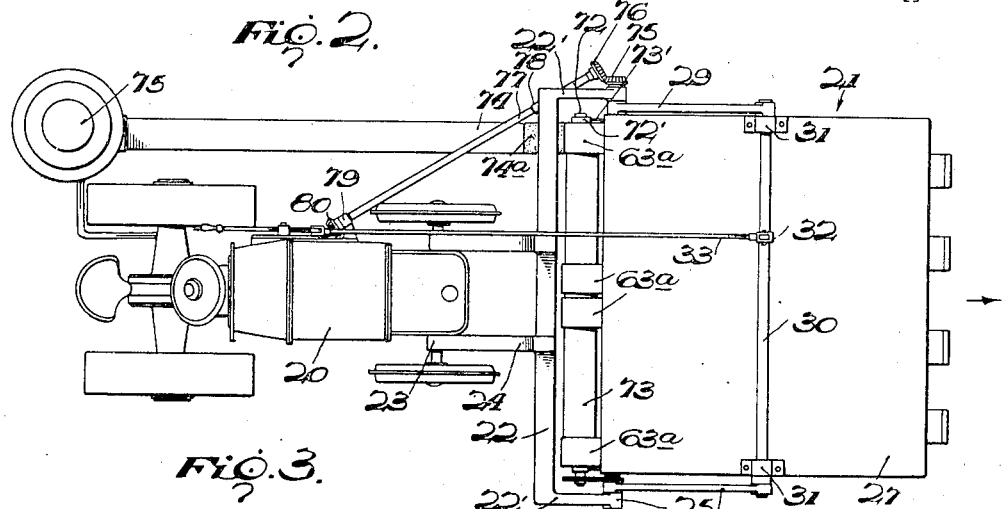
Figure 3:
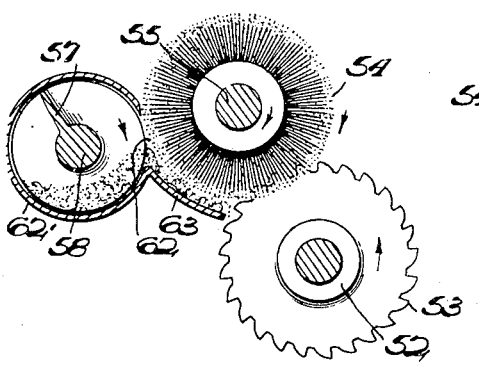

In the accompanying drawings forming a part of this application, and in which like numerals are employed to designate like parts throughout the same, Figure 1 is a side elevation of a cotton picking machine embodying my invention, as applied to a tractor, Figure 2 is a plan view of the same, Figure 3 is an enlarged transverse section through the elements of one picking unit, parts omitted, the section being taken on the same line with Figure 6.

Figure 4:
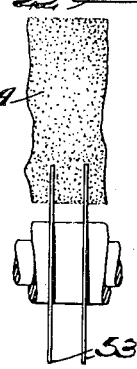

Figure 4 is a fragmentary side elevation of the rotary gin cylinder and brush of Figure 3, Figure 5 is a plan view of the cotton picking mechanism, the housing being in section, and parts omitted, Figure 6 is a transverse section taken on line 6—6 of Figure 5, Figure 7 is a longitudinal section taken on line 7—7 of Figure 5, Figure 8 is a similar view taken on line 8—8 of Figure 5, Figure 9 is a transverse section taken on line 9—9 of Figure 8, and, Figure 10 is a fragmentary perspective view of one runner.

In the drawings, wherein for the purpose of illustration is shown a preferred embodiment of my invention, the numeral 20 designates a tractor, such as an International tractor.

The numeral 21 designates a cotton picking machine as a whole, arranged in advance of the tractor and mounted thereon. This machine comprises a fixed transverse frame or support including a transverse bar 22 carrying forwardly projecting longitudinal arms 22'. Rigidly connected with the transverse bar 22 are diagonal arms 23, and horizontal arms 24 forming brackets which are suitably rigidly attached to the forward end of the tractor by any conventional means, as shown. It is thus seen that the transverse frame or bar 22 is fixedly mounted upon the forward end of the tractor and is horizontally supported at a suitable elevation. The arms 22' are provided at their forward ends with bearings 25, receiving a main transverse shaft 26, which is horizontal and transverse, as shown.

The numeral 27 designates a housing, having sides 28 which are pivotally mounted at their rear ends upon the transverse shaft 26. Arranged outwardly of and adjacent to the sides 28 are vertically swinging arms 29, having their rear ends pivoted upon the transverse shaft 26 and their forward ends rigidly mounted upon a transverse lift shaft 30. The lift shaft 30 is arranged above the housing 27 and is carried by brackets 31 and is rigidly secured thereto. These brackets are rigidly mounted upon the top of the housing 27 near its longitudinal center. The lift shaft 30 has an upstanding crank 32 rigidly connected therewith, pivotally connected with a rod 33, extending rearwardly for a pivotal connection with a hand lever 34, having latch means 35 so that it may be locked in the selected adjusted position. The lever 34 supports the housing 27 when shifted to the lowered position and is adapted to swing the housing to a raised position and to support the same in the raised position when the machine is being transported.

The picking machine is shown as designed to pick two rows of cotton at the same time. Arranged within the housing 27 are two picking mechanisms 36, one for each row. Each picking mechanism includes a pair of spaced picking units 37 forming a passage 38 for receiving the cotton plants. Each passage 38 is in alignment with an opening 39 formed in the front end of the housing 27, Figures 5 and 6 Each picking unit comprises a runner support 40, which is vertically inclined and extends upwardly in a rearward direction. This runner is provided at its forward end with an upturned end or nose 41. The forward end of the runner is arranged to contact with the ground and slides over the same and raises and lowers to conform to the contour of the ground. At its rear end, each runner 40 has upwardly projecting apertured knuckle or bearing 42, and 42' which are pivotally mounted upon the transverse shaft 26, so that the runner 40 can swing in a vertical plane. It is thus seen that both the housing 27 and the runners 40 are pivoted upon the shaft 26, to swing about the same, and the runners are individually movable to rise and fall with relation to the housing 27. Each runner 40 is provided near its forward end with an upstanding plate 43, preferably formed integral therewith. The upstanding plate 43 is arranged rearwardly of the front end of the housing 27, and is provided at its top with a horizontal extension or lift part 44, rigidly secured thereto, arranged above a horizontal lift element or lug 45, rigidly attached to the front end of the housing 27, as shown at 45'. A compressible coil spring 46 is arranged beneath the lug 45, in engagement therewith, and engages a lateral extension 47, rigidly secured to the upstanding plate 43. The spring 46 tends to move the extension 44 toward the lug 45, which then limits the downward movement of the runner 40 when extension 44 contacts with the lug 45. When the forward end of the housing 27 is elevated, the lug 45 will engage extension 44 and elevate the runner 40 so that the housing 27 and runner move upwardly as a unit. The housing 27 may also be held at adjusted elevations when in the lowered position. Each runner 40 may move upwardly individually with relation to the housing 27, in opposition to the spring 46.

Each picking unit 37 further comprises picking means mounted upon each runner 40. The picking means comprises an inclined shaft 48, extending longitudinally of the direction of travel of the machine and extending upwardly toward its rear end, so that it is parallel with its runner 40. The forward end of the shaft 48 is journalled in a bearing 49, carried by the plate 43, while its rear end is journalled in a bearing 50 carried by an upstanding plate 51, rigidly mounted upon the rear end portion of the runner in substantial alignment with the plate 43. Each shaft 48 has a picking cylinder 52 rigidly mounted thereon for rotation therewith. This picking cylinder has a plurality of circular gin saws 53, rotatable with the shaft 48. These gin saws may vary in diameter and may be from 6 to 12 inches in diameter, and the gin saws are preferably spaced for about one inch, although the distance may be varied. The numeral 54 designates a cylindrical rotary brush, rigidly mounted upon a shaft 55. This brush and shaft are vertically inclined, extend longitudinally of the gin cylinder 52 and runner 40 and are parallel therewith. The brush 54 is arranged above its gin cylinder 52 and slightly upon the outer side of the same. The brush 54 has its bristles overlapping the teeth of the gin saws 53, and these teeth operate within or between the bristles, Figures 3 and 4. The gin saw cylinder 52 and the brush 54 rotate in the direction of the arrows, Figures 3 and 6. At its forward end, the shaft 55 is journalled in a bearing 56 carried by the plate 43 and at its rear end is journalled in a bearing 57' carried by the plate 51, Figures 6 and 9. The numeral 57 designates a spiral conveyor or auger, having a shaft 58. At its forward end, the shaft 58 is journalled in a bearing 59 carried by the plate 43, Figure 9, and at its rear end is journalled in a bearing 60', carried by an arm 60, carried by the knuckle 42'. The spiral conveyor operates within a trough or tubular housing 62'. The spiral conveyor and its trough or tubular housing are disposed near and upon the outer side of the adjacent brush 54, and the spiral conveyor and its housing extend longitudinally of the brush 54, and are inclined and extend upwardly in a rearward direction and are parallel with the brush 54 The tubular housing 62' has its lower end closed by a head 63', having an opening to receive the shaft 58, while the upper end of the housing 62' is open and extends over the shaft 26. The cotton fed into the housing 62' discharges from its upper open end about the bearing 60', Figure 7. The housing 62' has its inner side next to the brush 54, Figures 3 and 6, provided with a longitudinal opening 62, which extends for the entire length of the brush 54. The housing 62' has a guard 63 leading to the bottom of the opening 62, and this guard 63 is positioned beneath the brush 54 and serves to guide the cotton to the spiral conveyor 57. The guard 63 terminates short of the gin saws 53 so that it cannot contact therewith. The conveyor 57 preferably rotates in the direction of the arrows, Figures 3 and 6.

Guard means are provided to limit the movement of the cotton plants toward each gin saw cylinder. Each guard means comprises an upper pair of rods 64 attached to extensions 65, carried by the plate 43, and to extensions 66 carried by the plate 51. These rods are spaced, extend longitudinally of the gin saw cylinder 52, are vertically inclined and extend upwardly in a rearward direction and are parallel with the gin saw cylinder. A guard 67 formed of sheet metal or the like has its longitudinal edges crimped about these rods. The guard 67 is arranged near and above the gin saws 53. The lower pair of rods 68 are attached to the plates 43 and 51 in a similar manner to the rods 64, and these rods extend longitudinally of the rods 64 and are parallel therewith. The rods 68 carry a guard 69 formed of sheet metal or the like, secured to the rods 68 in a similar manner in which the guard 67 is secured to the rods 64. The guard 69 is arranged near and beneath the saws 53 and is in vertical alignment with the guard 67 The saws 53 project through the space between the guards 67 and 69. The pairs of guards 67 and the pair of guards 69 define the width of the passage 38 and the saws project into this passage from opposite sides. The width of the passage 38 may be of any suitable dimension. The gin saws 53 may project into the passage for any suitable distance, such as three inches, although this distance may vary. This will cause the gin saws to engage the cotton and remove the same from the burrs.

The numeral 70 designates spaced ribs or tines, rigidly attached to the lower rod 64 and depending therefrom and passing between the spaced saws 53, and are spaced from the saws. The spaces between the ribs or tines and gin saws are sufficient to let the cotton and cotton-seed pass through, but the ribs or tines clean the cotton to a considerable extent, by removing trash, such as leaves, burrs or branches or the like.

Arranged at the rear of the spiral conveyors 57 is a transverse spiral conveyor 71, having a shaft 72, journalled in bearings 72', carried by arms 73' carried by sleeves 74', and these sleeves are rigidly secured to the knuckles 42' of the two outer picking units. This spiral conveyor operates within a transverse horizontal trough or housing 73, and this housing 73 is cylindrical and is provided at spaced intervals corresponding to the housings 62' with upstanding extensions 73a, leading into the housings 62' and connected or formed integral therewith. It is thus seen that all of the housings 62' discharge the cotton into the conveyor housing or trough 73. The left end of the housing 73 is closed and the conveyor 71 feeds the cotton to the right, and discharges the same into a conduit 74 through a flexible connection 74a, and the conduit 74 leads to a collecting receptacle 75, which may be moved along with the tractor and separated from the conduit 74, when it is filled. The feeding action of the conveyor 71 is sufficient to advance the cotton in the conduit 74, but additional means could be provided for this purpose, if desired.

The shaft 26 not only serves to pivotally support the housing 27 and associated elements but also serves to drive all movable parts of the picking mechanism. Shaft 26 is provided at one end with a beveled gear 75, to drive it, engaging a beveled gear 76 mounted upon a shaft 77 to turn therewith. This shaft is mounted in fixed bearings 78 and 79. The shaft 77 is equipped with a beveled gear 80 to turn it, and the beveled gear 80 is suitably driven from the usual power takeoff of the tractor. The shaft 26, Figure 5, is equipped with beveled gears 81, rigidly secured thereto, engaging beveled gears 82, rigidly mounted upon the shafts 48. The gin saw cylinders in each pair are rotated in opposite directions and the beveled gears 81 engage the opposite sides of the beveled gears 82, in each pair, to rotate the beveled gears 82 in each pair in opposite directions. Rigidly mounted upon each shaft 48 adjacent to the beveled gear 82 is a large gear 83, engaging a small gear 84, rigidly mounted upon the rear end of the shaft 35. The gears 83 and 84 therefore turn in opposite directions and the gin saw cylinder 52 and the companion brush 54 therefore rotate in opposite directions and the brush 54 rotates faster than the gin saw cylinder. At its forward end, the shaft 55 has a small pulley 85, driving a belt 86, engaging a large pulley 87, mounted upon the shaft 58 to turn it. The shaft 26 has a small pulley 88 rigidly mounted thereon, engaging a belt 89, driving a pulley 90, rigidly mounted upon the conveyor shaft 72.

As more clearly shown in Figures 3 and 6, the gin saws 53 are arranged between the ribs 70 and project beyond the inner sides of these ribs, next to the plants, while the shafts 48 of the gin saws 53 are disposed upon the opposite outer sides of the ribs 70 remote from the plants. The gin saws have their teeth facing in the direction in which the gin saws are turning, and the brushes 54 are arranged above the gin saws and between the gin saws and the conveyor casing 62'. The brushes rotate in opposite directions to the gin saws and that portion of the brush which engages the gin saws travels toward the free end of the teeth of the gin saws. The housing 62' and plate 63 are at an elevation above the shaft 48.

The operation of the machine is as follows:

The machine is driven down the rows of cotton plants and a row of plants is received within each passage 38. These plants enter the passage 38 through the opening 39. Since there is a pair of picking units in each picking mechanism, the rotary saws of the pair of gin cylinders are acting upon the cotton plants upon their opposite sides. These plants are crowded into the passage 38 and are brought into close relation to the rotating saws 53, but this relation is limited by the guards 67 and 68. The gin saws 53 engage the cotton and pull the same from the burrs and carry the cotton over the ribs or tines 70 and through the passages between the ribs and the gin saws. The cotton is held upon the teeth of the saws 53. The saws 53 in each pair are rotating upwardly adjacent to the cotton plants and then from the cotton plants, the saws in the pair turning in opposite directions. The cotton remains upon the teeth of the saws until it is brought outwardly beyond the ribs or tines 70. The brushes 54 are rotating in an opposite direction to the corresponding saws and in the direction of the free ends of the saw teeth. These brushes rotate faster than the saws, and may rotate twice as fast, and the brushes pull the cotton from the teeth of the gin saws. The brushes transfer the cotton to the spiral conveyors 57, which conduct the same to the transverse spiral conveyor 71, in turn feeding the same to the conduit 74. The gin saws 53 are driven at about 125 R. P. M. and the brushes would then be driven at about 250 R. P. M., while the spiral conveyors are driven relatively slowly, at any suitable speed to convey the cotton. The direction of rotation of each spiral conveyor is not important but its pitch is such that it will convey the cotton by virtue of its direction of rotation. The brushes should rotate in an opposite direction to the gin saws to travel toward their free ends. The guards or tines serve to clean most of the foreign matter from the cotton which passes the same.

The runners 40 travel upon the ground and are individually vertically adjustable or yieldable, and readily follow the contour of the ground, thus maintaining the picking units in proper relation to the cotton plants. Since the picking units are vertically inclined in a longitudinal direction and extend upwardly rearwardly, they act upon the cotton plants progressively throughout their entire vertical dimensions, starting near the bottom and completing the action near the top. This will permit of the picking units properly acting upon plants of different height.

When it is desired to transport the machine without operating the picking mechanism, the housing 27 and associated elements are raised, whereby the runners 40 clear the ground.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, what I claim is:

1. In a cotton picking machine, a support, a transverse shaft carried by the support, a housing pivotally mounted upon the transverse shaft to swing vertically, picking units arranged within the housing and including vertically swinging ground engaging runners which are individually pivotally mounted upon the shaft and individually vertically movable with relation to each other, a lifting part secured to each runner, a lug mounted upon the housing and arranged beneath the lifting part, a spring to swing each runner downwardly, means to drive the picking units, and means to raise the housing.

2. In a cotton picking machine, a support, a set of spaced upstanding ribs mounted upon the support to be disposed upon one side of the plants, a gin saw cylinder mounted upon the support upon the outer side of the ribs remote from the plants and including spaced gin saws projecting into the spaces between the ribs and extending beyond the inner side of the ribs next to the plants, all gin saws having saw teeth which face in the direction of rotation of the gin saw, a conveyor casing extending longitudinally of the gin saw cylinder at an elevation above the axis of rotation of the gin saw cylinder and spaced laterally from the gin saw cylinder, the conveyor casing having a longitudinal opening in its side next to the gin saw cylinder, a guide plate leading from the opening and terminating in close relation to the gin saw cylinder at an elevation above the axis of rotation of the gin saw cylinder, a rotary brush disposed between the gin saw cylinder and conveyor casing and arranged above the gin saw cylinder and guide plate and including bristles having overlapping relation with the teeth of the gin saw, driving means to rotate the gin saw cylinder so that its upper portion is turned toward the guide plate and to rotate the brush in an opposite direction to the gin saw cylinder so that the lower portion of the brush is traveling toward the guide plate and in the same direction in which the teeth of the gin saws are facing and traveling, and a conveyor element within the conveyor casing.

SIDNEY A. TOWNSEND.

REFERENCES CITED

The following references are of record in the file of this patent:

UNITED STATES PATENTS

| Number | Name | Date |
|---|---|---|
| 313,421 | Haselton | Mar. 3, 1885 |
| 1,223,328 | Neil | Apr. 17, 1917 |
| 1,345,527 | Barker | July 6, 1920 |
| 1,502,216 | Threadgill | July 22, 1924 |
| 1,780,472 | Gilger | Nov. 4, 1930 |
| 1,919,783 | Forrest | July 25, 1933 |
| 1,978,888 | Thomann | Oct. 30, 1934 |
| 2,355,880 | Macha | Aug. 15, 1944 |
| 2,406,058 | Boone | Aug. 20, 1946 |